United States Patent
Dariush

(10) Patent No.: US 11,449,065 B2
(45) Date of Patent: Sep. 20, 2022

(54) SYSTEM AND METHOD FOR CONTROLLING AN AUTONOMOUS CARRIAGE BASED ON USER INTENTIONS

(71) Applicant: Honda Motor Co., Ltd., Tokyo (JP)

(72) Inventor: Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 486 days.

(21) Appl. No.: 16/558,799

(22) Filed: Sep. 3, 2019

(65) Prior Publication Data
US 2021/0064048 A1  Mar. 4, 2021

(51) Int. Cl.
| | |
|---|---|
| G05D 1/02 | (2020.01) |
| G06K 9/00 | (2022.01) |
| G06N 3/08 | (2006.01) |
| H04L 29/08 | (2006.01) |
| H04L 67/306 | (2022.01) |
| G06V 20/56 | (2022.01) |
| G06V 40/20 | (2022.01) |
| H04L 67/52 | (2022.01) |

(52) U.S. Cl.
CPC ............. *G05D 1/0221* (2013.01); *G06N 3/08* (2013.01); *G06V 20/56* (2022.01); *G06V 40/25* (2022.01); *H04L 67/306* (2013.01); *H04L 67/52* (2022.05)

(58) Field of Classification Search
CPC .... G05D 1/0088; G05D 1/024; G05D 1/0246; G05D 1/0221; G05D 2201/0206; G06N 3/08; G06V 3/08; G06V 40/25; G06V 40/20; H04L 67/306
See application file for complete search history.

(56) References Cited

U.S. PATENT DOCUMENTS

| | | | |
|---|---|---|---|
| 9,494,439 B1* | 11/2016 | Ross | G05D 1/0287 |
| 2015/0229906 A1* | 8/2015 | Inacio De Matos | G06F 3/041 |
| | | | 348/46 |
| 2017/0090480 A1* | 3/2017 | Ho | G05D 1/0027 |
| 2017/0291544 A1* | 10/2017 | Ishihara | G06F 3/0304 |
| 2017/0350718 A1* | 12/2017 | Schulz | G06V 40/20 |
| 2020/0327317 A1* | 10/2020 | Park | G06V 20/53 |
| 2020/0357174 A1* | 11/2020 | Banerjee | G06T 19/00 |

(Continued)

FOREIGN PATENT DOCUMENTS

| | | |
|---|---|---|
| CN | 105005331 | 10/2015 |
| CN | 106483957 | 3/2017 |
| CN | 106681359 | 5/2017 |

(Continued)

*Primary Examiner* — Mussa A Shaawat
(74) *Attorney, Agent, or Firm* — Rankin, Hill & Clark LLP

(57) ABSTRACT

A system and method for controlling an autonomous carriage based on user intentions that include receiving data associated with a user that uses the autonomous carriage to transport at least one occupant. The system and method also include analyzing the data associated with the user to determine at least one intention of the user and analyzing a scene associated with a current point of interest location of the autonomous carriage. The system and method further include determining at least one travel path to be followed by the autonomous carriage during autonomous operation that is based on the at least one intention of the user and the scene associated with the current point of interest of the autonomous carriage.

20 Claims, 6 Drawing Sheets

(56) References Cited

U.S. PATENT DOCUMENTS

2020/0361324 A1\* 11/2020 Evans .................... B60P 3/007

FOREIGN PATENT DOCUMENTS

| | | |
|---|---|---|
| CN | 107054430 | 8/2017 |
| CN | 107097834 | 8/2017 |
| CN | 206805295 | 12/2017 |
| CN | 207123758 | 3/2018 |
| CN | 108363340 | 8/2018 |
| CN | 109189059 | 1/2019 |
| KR | 101638242 | 7/2016 |

\* cited by examiner

SYSTEM AND METHOD FOR CONTROLLING AN AUTONOMOUS CARRIAGE BASED ON USER INTENTIONS

BACKGROUND

Pushing a stroller or wheel chair in a crowded environment such as an amusement park, airport terminal, or a mall may be a cumbersome and challenging task for parents or care takers of an occupant such as a child or elderly person. In many situations, where there are many pedestrians and many strollers and/or wheel chairs that may be being pushed within such an environment, it may be a challenge to walk through certain areas efficiently. Accordingly, the convenience of transporting an occupant within the stroller or wheel chair to an intended location may be curtailed and may become a burden for the care takers.

BRIEF DESCRIPTION

According to one aspect, a computer-implemented method for controlling an autonomous carriage based on user intentions that includes receiving data associated with a user that uses the autonomous carriage to transport at least one occupant. The computer-implemented method also includes analyzing the data associated with the user to determine at least one intention of the user. The at least one intention pertains to an intended travel path of the user. The computer-implemented method additionally includes analyzing a scene associated with a current point of interest location of the autonomous carriage. The computer-implemented method further includes determining at least one travel path to be followed by the autonomous carriage during autonomous operation that is based on the at least one intention of the user and the scene associated with the current point of interest of the autonomous carriage.

According to another aspect, a system for controlling an autonomous carriage based on user intentions that includes a memory storing instructions when executed by a processor cause the processor to receive data associated with a user that uses the autonomous carriage to transport at least one occupant. The instructions also cause the processor to analyze the data associated with the user to determine at least one intention of the user. The at least one intention pertains to an intended travel path of the user. The instructions additionally cause the processor to analyze a scene associated with a current point of interest location of the autonomous carriage. The instructions further cause the processor to determine at least one travel path to be followed by the autonomous carriage during autonomous operation that is based on the at least one intention of the user and the scene associated with the current point of interest of the autonomous carriage.

According to still another aspect, a non-transitory computer readable storage medium storing instructions that when executed by a computer, which includes a processor perform a method, the method includes receiving data associated with a user that uses an autonomous carriage to transport at least one occupant. The method also includes analyzing the data associated with the user to determine at least one intention of the user. The at least one intention pertains to an intended travel path of the user. The method additionally includes analyzing a scene associated with a current point of interest location of the autonomous carriage. The method further includes determining at least one travel path to be followed by the autonomous carriage during autonomous operation that is based on the at least one intention of the user and the scene associated with the current point of interest of the autonomous carriage.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
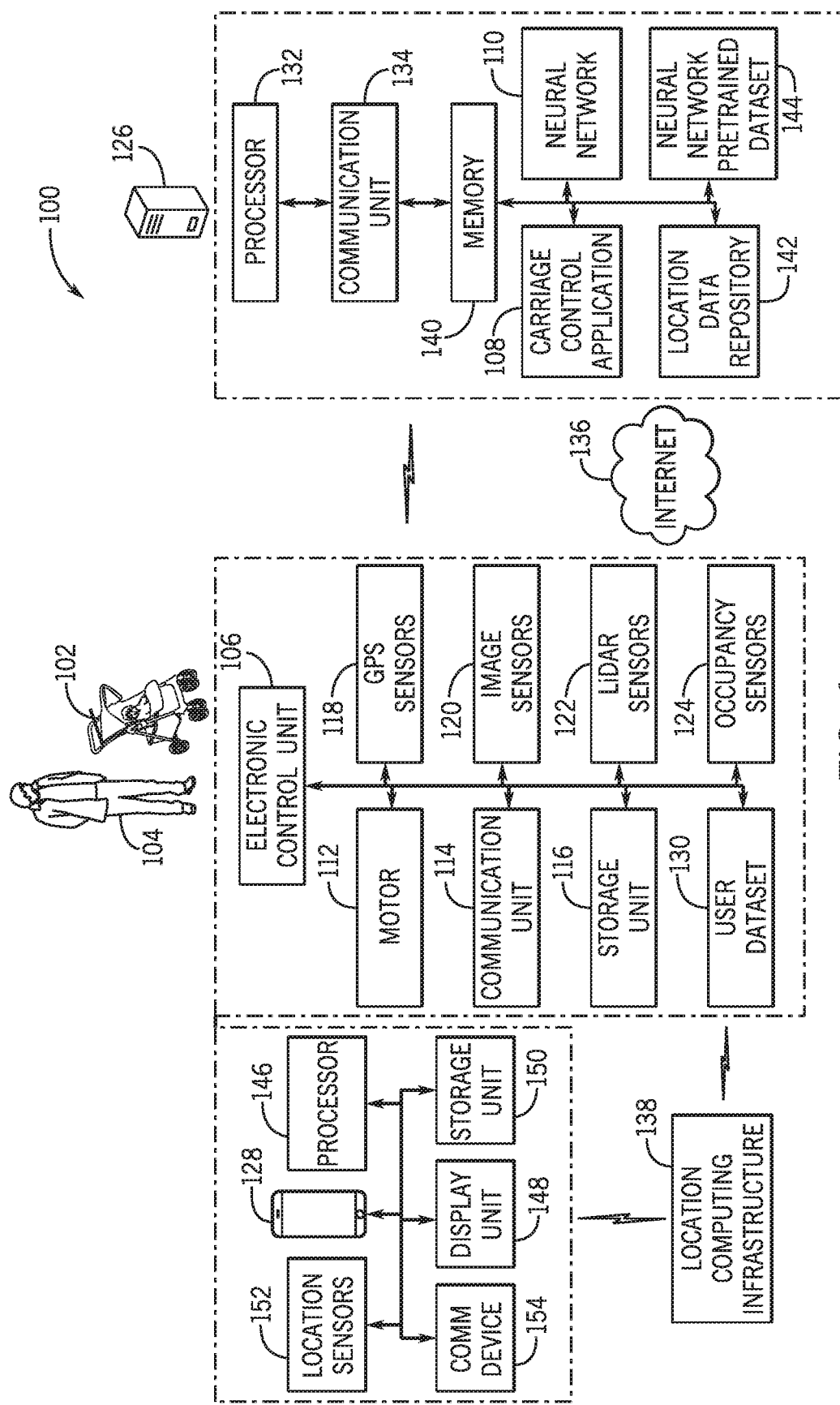
FIG. 1 is a schematic view of an exemplary operating environment for controlling an autonomous carriage based on user intentions according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus,' as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system," as used herein may include, but are not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. System Overview

Referring now to the drawings, wherein the showings are for purposes of illustrating one or more exemplary embodiments and not for purposes of limiting the same, FIG. 1 is a schematic view of an exemplary operating environment 100 for controlling an autonomous carriage (carriage) 102 based on user intentions according to an exemplary embodiment of the present disclosure. In an exemplary embodiment, the operating environment 100 may include the carriage 102 that may be operated by a user 104. The user 104 may include a parent, a care giver, and/or an individual who utilizes the carriage 102 to transport one or more occupants (e.g., baby, child, adult, elderly individual, animal). It is to be appreciated that the carriage 102 may include a stroller, a baby/child carrier, a wheel chair, a scooter, an automated shopping cart, an automated suit case, a personal transportation vehicle, and/or additional types of occupant/object transportation devices. However, for purposes of simplicity the above mentioned configurations may all be generally described as the carriage 102 within this disclosure.

In some embodiments, the carriage 102 may be configured to be operated in a manual mode by the user 104, such that the user 104 may move the carriage 102 manually (e.g., by pushing attached handles of the carriage 102). The carriage 102 may additionally be configured to be operated in a semi-automatic mode by the user 104, such that a motor 112 of the carriage 102 may provide a certain amount of motive power to assist in moving the carriage 102. The carriage 102 may additionally be operated within an autonomous mode. Within the autonomous mode, the carriage 102 may be operably controlled to be fully-autonomously operated or semi-autonomously operated to navigate within a particular location.

In an exemplary embodiment, the carriage 102 may include an electronic control unit (ECU) 106 that may be configured to execute a carriage control application 108. As discussed in more detail below, the carriage control application 108 may be configured to collect data associated with the user 104 and one or more scenes associated with a current point of interest location (e.g., GPS/DGPS location, house, mall, school, stadium, airport terminal, amusement park) in which the carriage 102 is traveling. The scene(s) may include a surrounding environment of the carriage 102 that is included as part of the current point of interest location of the carriage 102. As discussed below, the one or more scenes may be captured within one or more images that may be captured from image sensors 120 disposed upon one or more portions of the carriage 102. In particular, the scene(s) may include one or more navigable pathways, one or more sub-points of interest, one or more sub-locations, and the like that may be located within the surrounding environment of the current point of interest location of the carriage 102.

The one or more navigable pathways may include, but may not be limited to, roads, paths, trails, hallways, lanes, ramps, and/or spaces that may possibly be utilized by the carriage 102 to be traveled upon to reach one or more intended locations of the user 104. The one or more sub-points of interest may include, but may not be limited to, stores, restaurants, vendors, rooms, attractions, terminal gates, and the like that may be visited by the user 104. Additionally, the one or more sub-locations may include restrooms, stroller/wheel chair parking areas, ramps, elevators, and the like that may be located at or near the current point of interest location of the carriage 102.

As discussed below, the carriage control application 108 may be configured to initiate a learning mode of the application 108. In one or more embodiments, during manual operation of the carriage 102, the carriage control application 108 may be configured to execute the learning mode to determine one or more user preferences that may be associated with the user 104. The one or more user preferences may include, but may not be limited to, one or more routines, one or more habits, one or more preferred navigable pathways, one or more preferred sub-points of interest, and/or one or more preferred sub-locations that may be routinely used by the user 104 at one or more particular locations of the carriage 102.

In one embodiment, while executing the learning mode, the carriage control application 108 may also be configured to determine a gait and gesture recognition data that may be used to determine a walking pattern of the user 104 and one or more directive gestures that may be provided by the user 104 to indicate an intended direction of travel of the user 104. The carriage control application 108 may also communicate with a neural network 110 to determine scene data associated with a geography of the scene of the surrounding environment within the current point of interest location of the carriage 102 (e.g., current location in which the carriage 102 is being operated), one or more navigable pathways within the scene of the current point of interest location of the carriage 102, one or more sub-points of interest within the scene of the current point of interest location of the carriage 102 (e.g., stores and restaurants within a mall), and/or one or more sub-locations within the scene of the current point of interest location of the carriage 102.

During execution of the autonomous mode, the carriage control application 108 may be configured to receive data associated with the user 104 to be analyzed to determine one or more intentions of the user 104. The one or more intentions may include one or more intended directions in which the user 104 may intend to travel. The one or more intentions of the user 104 may be utilized to predict one or more travel pathways of the user 104 and/or one or more intended locations (e.g., immediate sub-points of interest and/or sub-locations that are located within or near the current point of interest location of the carriage 102) of the user 104. During the autonomous mode, the carriage control application 108 may also be configured to analyze one or more scenes associated with the current point of interest location of the carriage 102 to determine one or more classifications of the scene.

The one or more classifications may be based on the communication with the neural network 110 and the analysis of trained scene data associated with the geography of one or more scenes, one or more navigable pathways within the scene(s), one or more points of interest within the scene(s), and/or one or more sub-locations within the scene(s) (as learned during the learning mode of the application 108). The carriage control application 108 may also be configured to analyze one or more individuals, objects, and obstacles that may be encountered by the carriage 102 and/or one or more available navigable pathways that may be utilized by the carriage 102 to reach an intended location(s) of the user 104.

The carriage control application 108 may be configured to determine one or more travel paths that are to be followed by the carriage 102 during autonomous operation of the carriage 102 that may be based on one or more of the determined intentions of the user 104 and the one or more classifications of the scene associated with the current point of interest location of the carriage 102. In particular, the carriage control application 108 may operably control the carriage 102 to be autonomously operated to follow one or more travel paths while being in a particular proximity to the user 104 (e.g., two feet to ten feet from the user 104) and/or to reach an intended location of the user 104 as the user 104 arrives at the intended location or is located at the intended location.

As an illustrative example, if the user 104 frequently travels within a particular shopping mall, during manual operation of the carriage 102 by the user 104, the application 108 may be configured to determine scene data associated with one or more scenes of the current point of interest location of the carriage 102 and user preferences associated with the user 104 within the shopping mall as the carriage 102 is being manually pushed. During an autonomous operation mode, the application 108 may be configured to determine one or more intentions of the user 104 based on a walking pattern of the user 104 and/or one or more directive gestures that may be provided by the user 104 walking behind the carriage 102 as the carriage 102 is being autonomously controlled to travel in front of the user 104.

The carriage control application 108 may also be configured to analyze the scene(s) of the location of the carriage 102 within the shopping mall against the scene data and sensor data associated with respect to one or more individuals, objects, and obstacles that may be encountered by the carriage 102. The carriage control application 108 may thereby operably control the carriage 102 to autonomously follow one or more travel paths while being in proximity to the user 104 and/or to reach an intended location of the user 104 as the user 104 arrives at the intended location or is located at the intended location. Accordingly, the carriage 102 may be controlled to be autonomously operated based on user intentions.

With particular reference to the components of the carriage 102, the ECU 106 may be operably connected to the motor 112, a communication unit 114, and a storage unit 116. The ECU 106 may also be operably connected to a variety of different sensors of the carriage 102 that may include GPS sensors 118, the image sensors 120, LiDAR sensors 122, and occupancy sensors 124. It is appreciated that the ECU 106 may be operably connected to additional electrical and mechanical components of the carriage 102 not shown in FIG. 1 or explicitly discussed herein.

In an exemplary embodiment, the ECU 106 may be configured to execute one or more operating systems, carriage system and subsystem executable instructions, carriage sensor logic, and the like. In one or more embodiments, the ECU 106 may include a microprocessor, one or more application-specific integrated circuit(s) (ASIC), or other similar devices. The ECU 106 may also include respective internal processing memory, an interface circuit, and bus lines for transferring data, sending commands, and communicating with the plurality of components of the carriage 102. In one or more configurations, the ECU 106 may include a respective communication device (not shown) for sending data internally to components of the carriage 102 and communicating with externally hosted computing systems such as an external server 126 that are located external to the carriage 102 and are not physically connected to the carriage 102.

Generally, the ECU 106 may communicate one or more commands to a control unit (not shown) that may be associated with the motor 112 of the carriage 102. In one embodiment, the motor 112 may be configured as one or more electric motors that may be powered by one or more on-board batteries (not shown) (e.g., rechargeable batteries). In alternate embodiments, the motor 112 may be configured as to be powered by an alternate fuel source in lieu or in addition to the one or more on-board batteries. In one configuration, the motor 112 may be configured to provide motive power to operate the carriage 102 in the semi-automatic mode of the carriage 102 and the autonomous mode of carriage 102 to enable the carriage 102 to be fully or partially electronically/mechanically moved based on the use of the motor 112. The motor 112 may be configured to be operably connected to a steering system (not shown) and braking system (not shown) of the carriage 102 that may be configured to change the direction of travel of one or more wheels (not shown) of the carriage 102 and to slow or stop the carriage 102 to allow the carriage 102 to travel at one or more speeds and turn in one or more directions on one or more travel pathways within the current point of interest location of the carriage 102.

In some embodiments, the motor 112 may be operably connected to a weight balancing system (not shown) of the carriage 102 that may include one or more weights that may be distributed at one or more portions of the carriage 102. The weight balancing system may be configured to provide one or more levels of weight based on one or more occupants that are occupying the carriage 102 as determined based on data provided by the occupancy sensors 124, one or more turning angles that may be utilized by the steering system of the carriage 102, one or more grades of one or more pathways that may be encountered by the carriage 102, and/or one or more objects (e.g., bags) that may be attached to and/or held in one or more portions of the carriage 102 (e.g., an underneath storage compartment). Such weight may be provided to further stabilize the carriage 102 as its being operated to travel on one or more travel pathways within the current point of interest location of the carriage 102.

In additional embodiments, the motor 112 may be operably connected to a shock absorption system (not shown) of the carriage 102 that may include one or more shock absorbers that may be distributed at one or more portions of the carriage 102. The shock absorption system may be configured to provide one or more levels of shock absorption based on one or more occupants that are occupying the carriage 102 based on data provided by the occupancy sensors 124, one or more turning angles that may be utilized by the steering system of the carriage 102, one or more terrains that may be encountered by the carriage 102, one or more bumps that may be encountered by the carriage 102 and/or one or more objects that may be attached to and/or held in one or more portions of the carriage 102. Such shock absorption may be provided to further stabilize the carriage 102 as its being operated to travel on one or more travel pathways within the current point of interest location of the carriage 102.

In one or more embodiments, the ECU 106 may provide one or more commands with the communication unit 114 of the carriage 102 to communicate with a portable device 128 that may be used by the user 104 (e.g., carried by the user 104) and/or the external server 126. In one configuration, the communication unit 114 may be configured to send and receive data that may be analyzed, accessed, and/or stored by the carriage control application 108 during the learning mode of the application 108 and the autonomous mode of the application 108.

In one embediment, the communication unit 114 may be configured to provide near field communication (NFC) tracking based on one or more NFC signals that may be transmitted by the portable device 128 and received by the communication unit 114 of the carriage 102. In one configuration, the communication unit 114 may be configured to receive the one or more NFC signals communicated by the portable device 128. The one or more NFC signals may be analyzed by the application 108 to enable the carriage 102 to be located within a proximity (e.g., based on a user preference) of the user 104 (e.g., as the user 104 is walking within the current point of interest location of the carriage 102). Accordingly, the application 108 may analyze the walking pattern of the user 104, one or more gestures provided by the user 104, the location of the portable device 128, and/or may further analyze one or more classifications of the scene(s) of the surrounding environment of the carriage 102 within the current point of interest location to control the carriage 102 to travel to one or more intended locations of the user 104.

In one configuration, the communication unit 114 may be configured to communicate with the external server 126 to access one or more executable files and/or stored data associated with the carriage control application 108. As discussed, the communication unit 114 may be configured to retrieve location data that may be stored on the external server 126 that may be utilized to determine scene data associated with a geography of the scene(s) of the surrounding environment within the current point of interest location of the carriage 102, one or more navigable pathways within the scene of the current location, one or more sub-points of interest within the scene(s) of the current point of interest location of the carriage 102, and/or one or more sub-locations within the scene(s) of the current point of interest location of the carriage 102.

The communication unit 114 may also be configured to communicate with the external server 126 to access and utilize the neural network 110. The neural network 110 may be utilized to determine scene data associated with one or more scenes of one or more current locations of the carriage 102. During the autonomous mode, the communication unit 114 may be configured to communicate data to and receive data from the neural network 110 to determine one or more classifications of the scene(s) of the surrounding environment of the carriage 102. The one or more classifications may include classifications based on the communication with the neural network 110 and the analysis of trained scene data associated with the geography of the scene, one or more navigable pathways within the scene, one or more sub-points of interest within the scene, and/or one or more sub-locations within the scene.

In one or more embodiments, the ECU 106 may communicate with the storage unit 116 of the carriage 102 to execute one or more applications, operating systems, carriage systems and subsystem user interfaces, and the like that are stored on the storage unit 116. The storage unit 116 may be configured to store a user dataset 130. The user dataset 130 may be configured to store a user profile associated with the user 104 and one or more data points associated with the user 104 that may be included within the user profile. The one or more data points may include user recognition data that may be populated to enable the application 108 to identify and track the user 104 during autonomous operation of the carriage 102. The one or more data points may additionally include one or more user preferences that may be associated with the user 104 that may be determined during the learning mode of the application 108.

As discussed, the one or more user preferences may include, but may not be limited to, one or more routines, one or more habits, one or more preferred navigable pathways, one or more preferred sub-points of interest, and/or one or more preferred sub-locations that may be routinely used by the user 104 at one or more particular point of interest locations. In one or more embodiments, during the autonomous mode of the application 108, the application 108 and/or the neural network 110 may access the user dataset 130 to determine one or more intentions of the user 104 based on the walking pattern of the user 104, one or more directional gestures that may be provided by the user 104, and/or one or more user preferences as the user 104 is walking within a proximity of the carriage 102 within the current point of interest location of the carriage 102.

With particular reference to the various sensors of the carriage 102, the GPS sensors 118 may be configured to determine a current geo-location of the carriage 102 and may output the current geo-location as current geo-locational coordinates (e.g., GPS/DGPS coordinates) of the carriage 102 to the carriage control application 108. In some configurations, the carriage control application 108 may be configured to communicate with the GPS sensors 118 of the carriage 102 to determine the current point of interest location (e.g., mall, school, stadium, amusement park) of the carriage 102 to further learn or acquire location description data associated with the current point of interest location of the carriage 102.

In one embodiment, the image sensors 120 may include cameras (not shown) that may be disposed at one or more portions of the carriage 102. In one configuration, the image sensors 120 may be disposed at external front portions, side portions, and rear portions of the carriage 102 to capture images of the scene of the surrounding environment of the carriage 102 and the user 104 who may be located behind the carriage 102, pushing the carriage 102, and/or walking near the carriage 102. In some embodiments, the image sensors 120 may be configured as RGB cameras that may capture RGB bands that are configured to capture rich information about object appearance, as well as relationships and interactions between the carriage 102 and the user 104, one or more obstacles, objects, and/or individuals that may be located within the scene of the surrounding environment of the carriage 102 within the current point of interest location of the carriage 102.

In other embodiments, the image sensors 120 may additionally or alternatively configured as stereoscopic cameras that are configured to capture environmental information in the form three-dimensional images. The image sensors 120 may be configured to aggregate one or more images of the scene and convert the one or more aggregated images of the scene into image data that may be communicated to the carriage control application 108. As discussed below, the image data may be analyzed by the application 108 to determine data associated with the user 104 and scene data during the learning mode of the application 108. Additionally, the image data may be analyzed by the application 108 to determine data associated with the user's intentions and to determine one or more classifications of one or more scenes of the surrounding environment of the carriage 102. Accordingly, the image data may be analyzed and utilized to autonomously control the carriage 102 to reach an intended location of the user 104 as the user 104 arrives at the intended location (e.g., walking near the carriage 102 and/or walking away from the carriage 102) or is located at the intended location.

In an exemplary embodiment, the LiDAR sensors 122 may be disposed at one or more portions of the carriage 102. In one configuration, the LiDAR sensors 122 may be disposed at external front portions, side portions, and rear portions of the carriage 102 to transmit beams towards the surrounding environment of the carriage 102 and the user 104 who may be located behind the carriage 102, pushing the carriage 102, and/or is located near the carriage 102.

The LiDAR sensors 122 may include one or more planar sweep lasers that include respective three-dimensional LiDAR sensors that may be configured to oscillate and emit one or more laser beams of ultraviolet, visible, or near infrared light toward the scene of the surrounding environment of the carriage 102. The LiDAR sensors 122 may be configured to receive one or more reflected laser waves (e.g., signals) that are reflected off one or more objects included within the scene of the surrounding environment of the carriage 102. In other words, upon transmitting the one or more laser beams to the surrounding environment of the carriage 102, the one or more laser beams may be reflected as laser waves by the user 104, one or more obstacles objects, and/or individuals that may be located within the scene of the surrounding environment of the carriage 102 within the current point of interest location of the carriage 102.

In one embodiment, the LiDAR sensors 122 may be configured to analyze the reflected laser waves to determine LiDAR data associated with the locations of the user 104 and/or one or more obstacles, objects, and/or individuals that may be located within the scene of the surrounding environment of the carriage 102 within the current point of interest location of the carriage 102. The LiDAR sensors 122 may be configured to communicate the LiDAR data to the carriage control application 108 to be analyzed.

In some embodiments, the LiDAR data may be analyzed by the application 108 to determine data associated with the user 104 and scene data during the learning mode of the application 108. Additionally, the LiDAR data may be analyzed by the application 108 to determine data associated with the user's intentions and the real-time scene associated with the current point of interest location of the carriage 102 to determine one or more classifications of the scene. Accordingly, the LiDAR data may be analyzed and utilized to autonomously control the carriage 102 to reach an intended location of the user 104 as the user 104 arrives at the intended location (e.g., walking near the carriage 102 and/or walking away from the carriage 102) or is located at the intended location.

In one or more embodiments, the occupancy sensors 124 may be configured as capacitive touch sensors, proximity sensors, movement sensors, pressure sensors, weight sensors, and the like that may be configured to sense when one or more occupants are seated within the carriage 102 and/or one or more objects are placed within the carriage 102. The occupancy sensors 124 may be configured to send occupancy data that may include a classification of the occupant (e.g., baby, child, adult, etc.) to the application 108 to be analyzed. In some configurations, the occupancy data may be analyzed to determine if the carriage 102 may travel outside of a particular proximity (e.g., more than two feet) from the user 104 and/or if the carriage 102 may be autonomously controlled to autonomously self-park based on if the carriage 102 is occupied or unoccupied by a particular classification of occupant(s). For example, if the occupancy data indicates that a baby occupant is seated within the carriage 102, the application 108 may ensure that the carriage 102 does not travel more than two feet from the user 104 and that the carriage 102 does not travel to an area to autonomously self-park until the baby occupant is removed from the carriage 102.

In some configurations, the occupancy sensors 124 may be operably connected to an alert system (not shown) that communicates with a display screen (not shown) and/or one or more speakers (not shown) that may be disposed upon the carriage 102. The carriage 102 may additionally include an alert input button that may be presented as a physical button or a user interface input button that may enable the alert system to provide an alert each time the occupancy sensors 124 sense a change in occupancy status with respect to the carriage 102. The alert may be provided through the display screen and/or speaker(s) of the carriage 102 and/or through the portable device 128 based on communication by the communication unit 114 of the carriage 102. For example, during the autonomous mode of the application 108, the alert may be enabled to allow the user 104 to be alerted if there is a change in occupancy status with respect to the removal of the occupant(s) from the carriage 102.

With particular reference to the external server 126 of the environment 100, the external server 126 may be configured to store data associated with the carriage control application 108. Additionally, the external server 126 may be configured to execute the neural network 110 and store data that may be utilized during machine learning/deep learning techniques that are executed by the neural network 110. In one embodiment, the external server 126 may include a processor 132 that may operably control one or more components of the external server 126. For example, the processor 132 may be configured to execute the carriage control application 108. The processor 132 may also be configured as a neural network processing unit that is used to execute and process machine learning/deep learning techniques that are executed by the neural network 110.

The processor 132 may be operably connected to a communication unit 134 of the external server 126. The communication unit 134 may include one or more network interface cards (not shown) that may be configured to connect to one or more computing systems through an internet cloud 136. Such computing systems may include, but may not be limited to, computing systems of the carriage 102, the portable device 128 used by the user(s) 104, and/or a location computing infrastructure 138 (discussed in more detail below).

In one embodiment, the communication unit 134 may be configured to send data pertaining to the presentation of one or more user interfaces of the application 108 to be presented to the user 104 through the portable device 128 and/or through the display screen that may be disposed upon the carriage 102. The one or more user interfaces may be configured to allow the user 104 to input user profile information and information associated with one or more occupants that may be occupying the carriage 102 on a regular or semi-regular basis. Such user profile information and information associated with one or more occupants may include, but not limited to, the user's name, the occupant's name, the user's gender, the occupant's gender, the occupant's age, and the like. Additionally, the user 104 may input one or more user preferences via the user interface(s) that may be updated within the user profile associated with user 104.

Such preferences may include a customized proximity distance (e.g., two feet, ten feet, twenty feet) that the carriage 102 may travel from the location of the user 104. Additionally, such preferences may include particular settings associated with one or more preferred sub-points of interest, one or more preferred sub-locations, one or more preferred travel paths, and the like. In one or more embodiments, upon the input of one or more user preferences, data associated with the user preferences may be stored within the user profile associated with the user 104 upon the user dataset 130 stored on the storage unit 116 of the carriage 102.

In an exemplary embodiment, the processor 132 of the external server 126 may also be operably connected to a memory 140. The memory 140 may be configured to store data files associated with one or more applications, operating systems, vehicle systems, subsystem user interfaces, including but not limited to data files of the carriage control application 108. In one embodiment, the memory 140 may be configured to store a location data repository 142. The location data repository 142 may be configured as a relational database/data store that may include various records that may each include stored data that pertains to one or more particular point of interest locations (e.g., mall, school, stadium, amusement park, etc.) and associated geo-location coordinates of the one or more particular point of interest locations. Each record of the location data repository 142 may be updated with a description of point of interest locations that may include names, maps, sub-points of interest names, sub-location names, and the like that may be updated based on data that is provided from the location computing infrastructure 138.

In one embodiment, the location data repository 142 may include one or more computing devices that may communicate with one or more third-party entities that may include, but may not be limited to application program developers, navigational application program interfaces providers, search engine developers/providers, reservation applications developers/providers, user review application developers/providers, and the like. In one or more embodiments, the location data repository 142 may be updated in real-time to provide geo-locational coordinates associated with one or more areas of point of interest locations (e.g., current point of interest location of the carriage 102), point of interest data associated with sub-points of interest located at the point of interest locations, location data associated with sub-locations located at the point of interest locations, navigational travel paths associated with travel pathways located at the point of interest locations, maps of one or more areas of the point of interest locations, floorplans of one or more areas of the point of interest locations, and associated data that may pertain to one or more particular areas located at the point of interest locations.

In some embodiments, the carriage control application 108 may be configured to access the location data repository 142 to query the repository based on the current geo-locational coordinates of the carriage 102 to retrieve location description data that is associated with the current point of interest location of the carriage 102. Such data may be updated by the location computing infrastructure 138 and may accordingly be updated in real-time to allow the application 108 to determine scene data associated with one or more scenes of the surrounding environment of the carriage 102 within the current point of interest location of the carriage 102.

With particular reference to the neural network 110, the neural network 110 may be configured as a shallow neural network, a convolutional neural network, a Recurrent Neural Network that includes a plurality of fully connected layers, or another type of neural network. In one embodiment, the neural network 110 may utilize the processor 132 of the external server 126 to process a programming model which enables computer/machine based/deep learning that may be centered on one or more forms of data that are inputted to the neural network 110. As discussed below, scene data may be inputted to the neural network 110 during the learning mode of the application 108 that may be further analyzed during the autonomous mode of the application 108.

Data that may be inputted to the neural network 110 during the learning mode and/or the autonomous mode of the application 108 may be utilized to train the neural network 110 with scene data. Such scene data may be stored within the neural network pretrained dataset 144. The neural network pretrained dataset 144 may include encrypted data that may include with one or more subsets of data that pertain to one or more scenes that may be input to the neural network 110 to be trained during the learning mode of the application 108 and/or that may be pretrained to the neural network 110. In some configurations, the pre-training of the neural network 110 may be completed by a third-party such as a carriage manufacturer or third-party entity based on numerous hours of real-world carriage operating scenarios, captured sensor data pertaining to the one or more locations, and captured sensor data pertaining to one or more individuals.

The neural network pretrained dataset 144 may also include encrypted data that pertains to image logic that may be utilized to determine one or more data points that pertain to facial and body characteristics of the user 104, to the gait of the user 104, and/or one or more gestures that may be provided by the user 104. The neural network pretrained dataset 144 may also include encrypted data that pertains to LiDAR logic that may be utilized to determine one or more data points that pertain to one or more obstacles, objects, and/or individuals that may be located within the scene(s) of the surrounding environment of the carriage 102 within the current point of interest location of the carriage 102.

As discussed below, the neural network 110 may be configured to access the neural network pretrained dataset 144 and may execute computer/machine based/deep learning techniques to analyze image data and/or LiDAR data that may be provided by the image sensors 120 and/or the LiDAR sensors 122 to analyze the scene data against the neural network pretrained dataset 144 during the autonomous mode of the application 108. The application 108 may accordingly determine classifications and attributes related to the scene of the surrounding environment of the carriage 102 within the location of the carriage 102.

Additionally, the neural network 110 may be configured to access the neural network pretrained dataset 144 and may execute computer/machine based/deep learning techniques to analyze image data and/or LiDAR data to analyze a direction of walking, a walking pattern of the user 104 and/or one or more directional gestures that may be provided by the user 104 during the autonomous mode of the application 108. As discussed below, the walking pattern and the directional gesture(s) provided by the user 104 may be analyzed in addition to user preferences to determine one or more intentions of the user 104 with respect to traveling to one or more intended (immediate) locations. In one or more embodiments, the carriage control application 108 may communicate with the neural network 110 to thereby determine one or more navigable travel paths that may be utilized by the carriage 102 to autonomously travel to one or more intended locations based on evaluation of the scene of the surrounding environment of the carriage 102 within the current point of interest location of the carriage 102 and the one or more intentions of the user 104.

With particular reference to the portable device 128 being used by the user 104 (e.g., portable device 128 carried by the user 104), the portable device 128 may include, but may not be limited to, mobile devices such as mobile phones or smart phones, hand held devices such as tablets, laptops, e-readers, etc. In one configuration, components (e.g., electronic components) of the portable device 128 may be operably controlled by a processor 146 that may be configured to provide processing and computing functions. The processor 146 may be configured to execute one or more applications that may include one or more user interfaces that may be displayed through a display unit 148 of the portable device 128. In particular, the processor 146 may be configured to fully or partially execute the carriage control application 108.

In one embodiment, the display unit 148 of the portable device 128 may be configured as a touch input display (not shown) that is capable of receiving touch inputs from the user(s) 104 to provide inputs to one or more user interfaces (e.g., human machine interfaces) of the carriage control application 108. The processor 146 may be configured to thereby present one or more user interfaces of the application 108 to the user 104 through the display unit 148 of the portable device 128 that may enable the user 104 to input user profile information and information associated with one or more occupants that may be occupying the carriage 102 on a regular or semi-regular basis.

In one or more embodiments, the processor 146 may be operably connected to a storage unit 150 of the portable device 128. The storage unit 150 may store one more operating systems, applications, associated operating system data, application data, application user interface data, and the like that are executed by the processor 146. In some embodiments, the storage unit 150 of the portable device 128 may be configured to store the user profile (e.g., copy of the user profile) that is associated with the user 104. Accordingly, in such embodiments, the application 108 may be configured to access the storage unit 150 of the portable device 128 to retrieve the user profile to determine one or more user preferences that may be associated with the user 104.

In an alternate embodiment, the storage unit 150 may be configured to store map data (not shown) that may be accessed by location sensors 152 of the portable device 128. The map data may be continually updated based on a computer communication between the portable device 128 and one or more external systems, including, but not limited to, the external server 126 and/or the location computing infrastructure 138. In one or more embodiments, the map data may be accessed by the location sensors 152 and/or the carriage control application 108 to determine location data that may include geo-locational coordinates associated with one or more areas of the location, point of interest data associated with sub-points of interest located at the location, sub-location data associated with sub-locations located at the location, navigational travel paths associated with travel pathways located at the location, maps of one or more areas of the location, floorplans of one or more areas of the location, and associated data that may pertain to one or more particular locations pertaining to the current location of the portable device 128, the user 104, and the carriage 102.

In one embodiment, the location sensors 152 may be configured to determine a current geo-location of the portable device 128 and may output the current geo-location as current geo-locational coordinates (e.g., GPS/DGPS coordinates) of the portable device 128 to the carriage control application 108. Accordingly, the carriage control application 108 may be configured to communicate with the location sensors 152 of the carriage 102 to determine the current point of interest location of the carriage 102 to further learn or acquire scene data associated with the scene(s) of the surrounding environment of the carriage 102.

In an exemplary embodiment, the processor 146 may be operably connected to a communication device 154 of the portable device 128. The communication device 154 may include antennas and components that may be utilized for wired and wireless computer connections and communications via various protocols. The communication device 154 may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication device 154 may be configured to transmit one or more NFC signals to be received by the communication unit 114 of the carriage 102. The application 108 may be configured to analyze the one or more NFC signals communicated by the communication device 154 and received by the communication unit 114 of the carriage 102 to enable the carriage 102 to be autonomously operated/located within a particular proximity (e.g., based on a user preference) of the user 104 as the user 104 is walking within the current point of interest location of the carriage 102. In other words, the application 108 may be configured to track the location of the user 104 based on the receipt of one or more NFC signals that are communicated by the communication device 154 of the portable device 128 and received by the communication unit 114 of the carriage 102. For example, the application 108 may be configured to enable the carriage 102 to track the location of the user 104 in order to continually travel within a proximity of two feet in front of the user 104 as the user 104 walks within a shopping mall.

II. The Carriage Control Application and Related Methods

The general functionality of the carriage control application 108 will now be discussed in more detail with respect to exemplary methods that may be executed by the application 108. In an exemplary embodiment, the carriage control application 108 may be fully or partially executed by the ECU 106 of the carriage 102. Additionally or alternatively, the carriage control application 108 may be fully or partially executed by the processor 132 of the external server 126 and/or the processor 146 of the portable device 128. The carriage control application 108 may utilize the communication unit 114 of the carriage 102, the communication unit 134 of the external server 126, and/or the communication device 154 of the portable device 128 to communicate application related data between the carriage 102, the portable device 128, and the external server 126.

Figure 2:
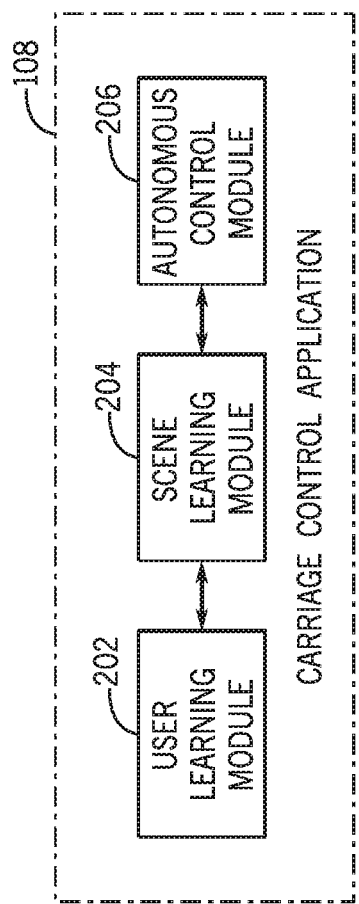
FIG. 2 is a schematic view of a plurality of modules of a carriage control application that may execute computer-implemented instructions for controlling the carriage based on user intentions according to an exemplary embodiment of the present disclosure.

FIG. 2 is a schematic view of a plurality of modules 202-206 of the carriage control application 108 that may execute computer-implemented instructions for controlling the carriage 102 based on user intentions according to an exemplary embodiment of the present disclosure. In an exemplary embodiment, the plurality of modules 202-206 may include a user learning module 202, a scene learning module 204, and an autonomous control module 206. It is appreciated that the carriage control application 108 may include one or more additional modules and/or sub-modules that are included in lieu of the modules 202-206.

In one or more configurations, the learning mode of the application 108 may be implemented during for a predetermined period of time after the initial utilization of the carriage 102. In some configurations, the learning mode may be implemented each time the carriage 102 is manually operated by the user 104. In some embodiments, the learning mode may be implemented each time the carriage 102 is determined to be located within a new (previously unvisited) point of interest location and/or if the carriage 102 is determined to be located within a particular point of interest location after a predetermined period of time.

In one embodiment, the autonomous mode of the application 108 may be implemented each time the user 104 utilizes one or more user interfaces or a physical input (e.g., switch) (not shown) disposed upon the carriage 102 to initiate autonomous operation of the carriage 102 to enable the carriage 102 to be fully-autonomously operated or semi-autonomously operated to navigate within a particular point of interest location. As discussed below, the application 108 may utilize user attributes and scene classifications learned during the learning mode of the application 108 to operably control the carriage 102 to be autonomously operated to follow one or more travel paths while being in proximity to the user 104 and/or to reach an intended location(s) of the user 104 as the user 104 arrives at the intended location(s) or is located at the intended location(s).

Figure 3:
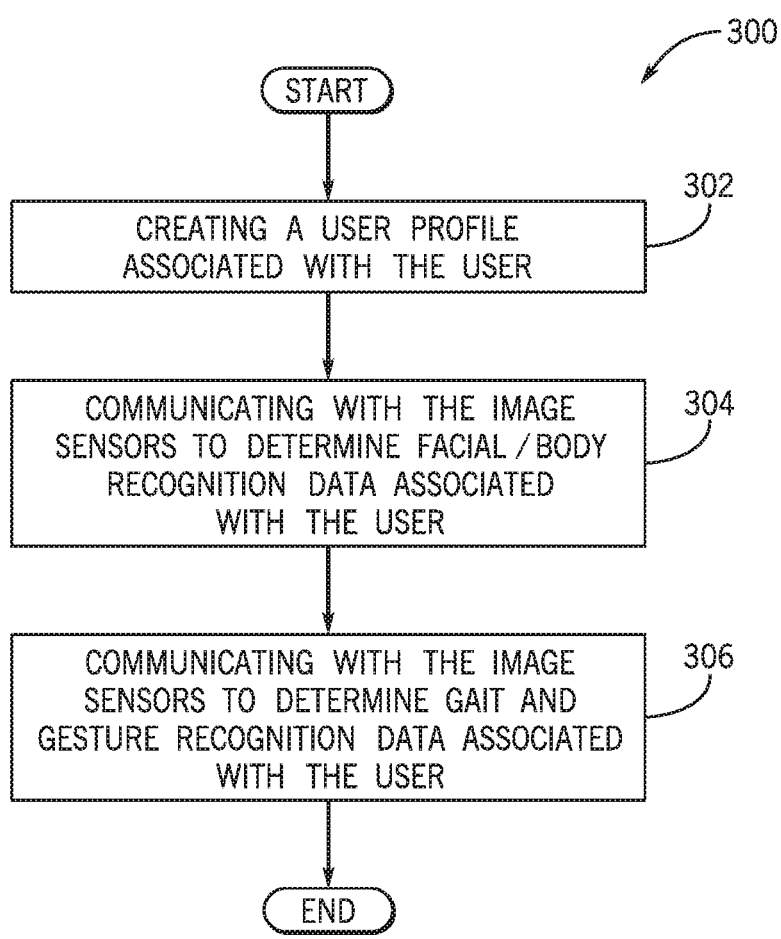
FIG. 3 is a process flow diagram of a method for learning user attributes according to an exemplary embodiment of the present disclosure.

FIG. 3 is a process flow diagram of a method 300 for learning user attributes according to an exemplary embodiment of the present disclosure. FIG. 3 will be described with reference to the components of FIG. 1, through it is to be appreciated that the method 300 of FIG. 3 may be used with additional and/or alternative system components. The method 300 may begin at block 302, wherein the method 300 may include creating a user profile associated with the user 104.

In an exemplary embodiment, the user learning module 202 of the carriage control application 108 may be configured to execute the method 300 during the learning mode of the application 108 to learn one or more attributes that may be associated with the user 104. The learning mode of the application 108 enables the application 108 to collect data and create a user profile associated with the user 104. The user profile may be populated with user recognition data that may allow the application 108 to recognize the user 104 during autonomous operation of the carriage 102.

In one embodiment, the user learning module 202 may be configured to present one or more user interfaces to the user 104 through the portable device 128 and/or through the display device that may be disposed upon the carriage 102. The one or more user interfaces may be configured to allow the user 104 to input user profile information and information associated with one or more occupants that may be occupying the carriage 102 on a regular or semi-regular basis. Such user profile information and information associated with one or more occupants may include, but not limited to, the user's name, the occupant's name, the user's gender, the occupant's gender, the occupant's age.

Upon receiving profile information through the user interface(s), the user learning module 202 may be configured to create the user profile that is associated with the user 104 as a data file (e.g., readable/writable data file). In one embodiment, upon creation of the user profile associated with the user 104, the user learning module 202 may be configured to access the storage unit 116 of the carriage 102 and store the user profile associated with the user 104 upon the user dataset 130.

The method 300 may proceed to block 304, wherein the method 300 may include communicating with the image sensors 120 to determine facial/body recognition data associated with the user 104. In an exemplary embodiment, the user learning module 202 may be configured to communicate with the image sensors 120 of the carriage 102 to receive image data associated with one or more images of the user 104. The one or more images of the user 104 may be captured as the user 104 is manually operating the carriage 102 and/or walking within a predetermined proximity of the carriage 102 during the learning mode and/or the autonomous mode of the application 108. In another embodiment, the user learning module 202 may be additionally or alternatively be configured to access the storage unit 116 to receive image data that may be stored during one or more previous periods of time by the image sensors 120.

Upon receiving and/or retrieving the image data, the user learning module 202 may be configured to communicate with the neural network 110 stored on the external server 126 to utilize the image logic stored within the neural network pretrained dataset 144 to determine one or more facial recognition data points and/or body recognition data points. Such data points may include specific measurements that may account for nodal points associated with different characteristics of the user's face and body. For example, such measurements may pertain to a distance between the eyes of the user 104, width of the user's torso, width of the user's nose, length of the user's arms, hands, and/or fingers, the shape of the user's cheekbones, the length of the user's legs, the length of the user's jaw line, and the like.

Upon determining one or more facial recognition data points and/or body recognition data points, the neural network 110 may be configured to communicate the data points to the user learning module 202. The user learning module 202 may be configured to thereby access the user profile associated with the user 104 stored upon the user dataset 130 and may store the one or more facial recognition data points and/or body recognition data points. As discussed below, the one or more facial recognition data points and/or body recognition data points may be accessed and analyzed by the application 108 during the autonomous mode of the application 108 to identify the user 104 within the current point of interest location of the carriage 102.

The method 300 may proceed to block 306, wherein the method 300 may include communicating with the image sensors to determine gait and gesture recognition data associated with the user 104. In an exemplary embodiment, the user learning module 202 may be configured to communicate with the image sensors 120 of the carriage 102 to receive image data associated with one or more images of the user 104. The one or more images of the user 104 may be captured as the user 104 is walking within a proximity of the carriage 102 (e.g., using a subjective style of walking) and/or providing one or more directive gestures (e.g., pointing towards a particular direction) that may be provided by the user 104 to indicate an intended direction of movement of the user and/or the carriage 102.

Upon receiving and/or retrieving the image data, the user learning module 202 may be configured to communicate with the neural network 110 stored on the external server 126 to utilize the image logic stored within the neural network pretrained dataset 144 to determine gait recognition data and/or gesture recognition data. Such data may include specific measurements that may account for various patterns of movements of the user's head, torso, arm, hands, legs, and/or feet. For example, such measurements may pertain to walking movements of the user 104 and/or one or more particular arm and hand movements as the user 104 is manually operating the carriage 102 and/or walking within a predetermined proximity of the carriage 102 during the learning mode and/or the autonomous mode of the application 108.

Upon determining gait recognition data and/or gesture recognition data, the neural network 110 may be configured to communicate the data to the user learning module 202. The user learning module 202 may be configured to thereby access the user profile associated with the user 104 stored upon the user dataset 130 and may store the gait recognition data and/or gesture recognition data. As discussed below, the gait recognition data and/or gesture recognition data may be accessed and analyzed by the application 108 during the autonomous mode of the application 108 to determine one or more intentions of the user 104 within the current point of interest location of the carriage 102.

Figure 4:
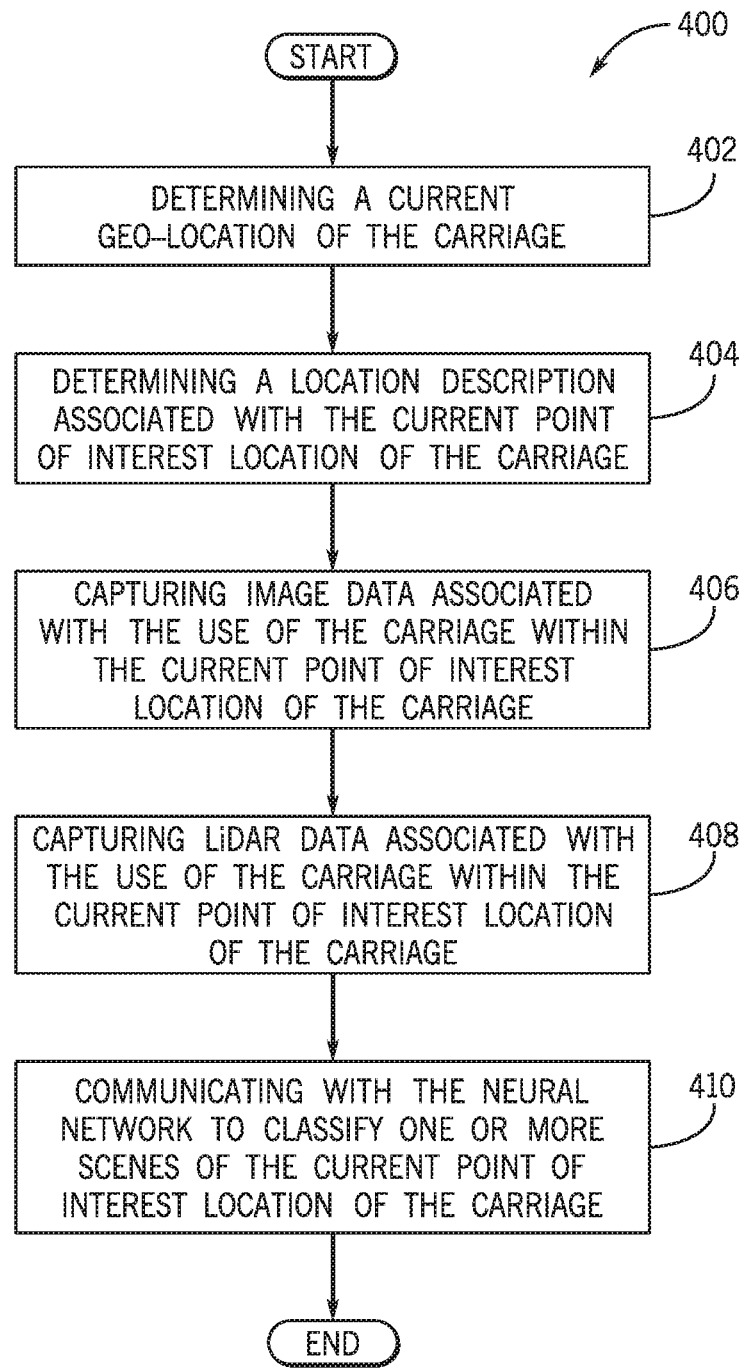
FIG. 4 is a process flow diagram of a method for learning classifications associated with one or more scenes of the current point of interest location of the carriage according to an exemplary embodiment of the present disclosure.

FIG. 4 is a process flow diagram of a method 400 for learning classifications associated with one or more scenes of the current point of interest location of the carriage 102 according to an exemplary embodiment of the present disclosure. FIG. 4 will be described with reference to the components of FIG. 1, through it is to be appreciated that the method 400 of FIG. 4 may be used with additional and/or alternative system components. The method 400 may begin at block 402, wherein the method 400 may include determining a current geo-location of the carriage 102.

In an exemplary embodiment, the scene learning module 204 of the application 108 may be configured to communicate with the GPS sensors 118 of the carriage 102 to determine the current geo-location of the carriage 102 in the form of current geo-locational coordinates. In an additional embodiment, the scene learning module 204 may additionally or alternatively be configured to communicate with the location sensors 152 of the portable device 128 to determine the current geo-location of the carriage 102 in the form of the current geo-locational coordinates.

The method 400 may proceed to block 404, wherein the method 400 may include determining a location description associated with the current point of interest location of the carriage 102. In an exemplary embodiment, the scene learning module 204 may be configured to classify the current point of interest location of the carriage 102 by determining a location description associated with the current point of interest location of the carriage 102. In one embodiment, upon determining the current geo-locational coordinates associated with the current point of interest location of the carriage 102, the scene learning module 204 may access the location data repository 142 on the memory 140 of the external server 126.

As discussed above, the location data repository 142 may be configured as a relational database/data store that may include various records that may each include stored data that pertains to one or more particular point of interest locations and associated geo-location coordinates of the one or more particular point of interest locations. Each record of the location data repository 142 may be updated with a description of point of interest locations that may include names, maps, sub-points of interest names, sub-location names, sub-points of interest categories, sub-location categories and the like that may be updated based on data that is provided from the location computing infrastructure 138.

In one configuration, upon accessing the location data repository 142, the scene learning module 204 may be configured to query the location data repository 142 with the current geo-locational coordinates associated with the current point of interest location of the carriage 102. Upon querying the location data repository 142, the scene learning module 204 may determine the location description associated with the current point of interest location of the carriage 102. The location description may be a name and classification associated with the current point of interest location of the carriage 102. For example, the location description may be a name and classification of a particular shopping mall in which the carriage 102 is being operated.

In one embodiment, upon determining the location description associated with the current location of the carriage 102, the scene learning module 204 may additionally retrieve data associated with the current point of interest such as data associated with sub-points of interests (e.g., stores, restaurants) that may be located within the current point of interest of the carriage 102. The scene learning module 204 may additionally retrieve data associated with one or more sub-locations (e.g., restrooms, elevators, ramps) that may be located within the current point of interest of the carriage 102. In some embodiments, the scene learning module 204 may be configured to retrieve data that pertains to travel pathways located at the current point of interest location of the carriage 102, maps of one or more areas of the current point of interest location of the carriage 102, floorplans of one or more areas of the current point of interest location of the carriage 102, and associated data that may pertain to one or more particular areas of the current point of interest location of the carriage 102.

The method 400 may proceed to block 406, wherein the method 400 may include capturing image data associated with the use of the carriage 102 within the current point of interest location of the carriage 102. In an exemplary embodiment, the scene learning module 204 may be configured to communicate with the image sensors 120 of the carriage 102 to capture one or more images of one or more scenes of the current point of interest location of the carriage 102 as the user 104 is operating the carriage 102. In some configurations, the image sensors 120 may capture such images during the manual mode and/or the autonomous mode of the application 108. The image sensors 120 may be configured to communicate image data to the scene learning module 204.

Upon receiving and/or retrieving the image data, the scene learning module 204 may be configured to communicate with the neural network 110 stored on the external server 126 to utilize the image logic stored within the neural network pretrained dataset 144 to determine one or more point of interest location data points. Such data points may pertain to one or more sub-points of interests, sub-locations, and/or user preferences with respect to the particular point of interest location of the carriage 102. For example, one or more point of interest location data points may pertain to one or more sub-points of interests that may be located at the current point of interest location and that may be preferred by the user 104 and/or one or more sub-locations that may be located at the current point of interest location and that may be preferred by the user 104.

The method 400 may proceed to block 408, wherein the method 400 may include capturing LiDAR data associated with the use of the carriage 102 within the current point of interest location of the carriage 102. In an exemplary embodiment, the scene learning module 204 may be configured to communicate with the LiDAR sensors 122 of the carriage 102 to determine LiDAR data associated with the locations of the user 104 and/or one or more obstacles, objects, and/or individuals that may be located within the scene of the surrounding environment of the carriage 102 within the current point of interest location of the carriage 102 as the user 104 is operating the carriage 102. In some configurations, the LiDAR sensors 122 may provide LiDAR data during the manual mode and/or the autonomous mode of the application 108.

Upon receiving and/or retrieving the LiDAR data, the scene learning module 204 may be configured to communicate with the neural network 110 stored on the external server 126 to utilize the LiDAR logic stored within the neural network pretrained dataset 144 to determine one or more point of interest data points that may be based on the LiDAR data. As stated above, such data points may pertain to one or more sub-points of interests, sub-locations, and/or user preferences with respect to the particular point of interest location of the carriage 102. For example, one or more point of interest location data points may include one or more stores, restaurants, pathways, restrooms, elevators, ramps, and the like that may be located at the current point of interest location of the carriage 102 and that may be preferred by the user 104 based on heavy utilization of such locations during the learning mode and/or the autonomous mode of the application 108

The method 400 may proceed to block 410, wherein the method 400 may include communicating with the neural network 110 to classify one or more scenes of the current point of interest location of the carriage 102. In one or more embodiments, upon determining the location description associated with the current point of interest location and one or more point of interest location data points that are based on image data and/or LiDAR data, the scene learning module 204 may communicate with the neural network 110 to train the neural network 110 with classification data that is associated with one or more scenes of the current point of interest location of the carriage 102. Additionally, the scene learning module 204 may communicate with the neural network 110 to train the neural network 110 with point of interest data points may pertain to one or more sub-points of interests, sub-locations, and/or user preferences with respect to the particular point of interest location of the carriage 102.

More specifically, the scene learning module 204 may communicate with the neural network 110 to train the neural network 110 by communicating classification data associated with the location description, one or more point of interest location data points that include data associated with user preferences to the neural network 110 to be updated within the neural network pretrained dataset 144. Accordingly, the neural network pretrained dataset 144 may be trained with classification data that pertain to the classifications of one or more scenes that may be captured based on one or more images of the current point of interest location of the carriage 102.

The classifications of one or more scenes may include, but may not be limited to, the classification of one or more navigable pathways that may include, but may not be limited to, roads, paths, trails, hallways, lanes, ramps, and/or spaces that may possibly be utilized by the carriage 102 to be traveled upon to reach an intended location of the user 104. The classifications of the one or more scenes may also include the classification of one or more sub-points of interest that may be classified as, but may not be limited to, particular stores, particular restaurants, particular vendors, particular attractions, particular terminal gates, particular rooms, and the like that may be visited by the user 104.

Additionally, the classifications of the one or more scenes may also include the classification of one or more sub-locations that may be classified as but may not be limited to, particular restrooms, particular (designated) stroller/wheel chair parking areas, particular ramps, particular elevators, and the like that may be located within one of more scenes of the current point of interest location of the carriage 102. The neural network pretrained dataset 144 may also be trained with one or more point of interest data points that may pertain to one or more sub-points of interests, sub-locations, and/or user preferences with respect to the particular point of interest location of the carriage 102.

Figure 5:
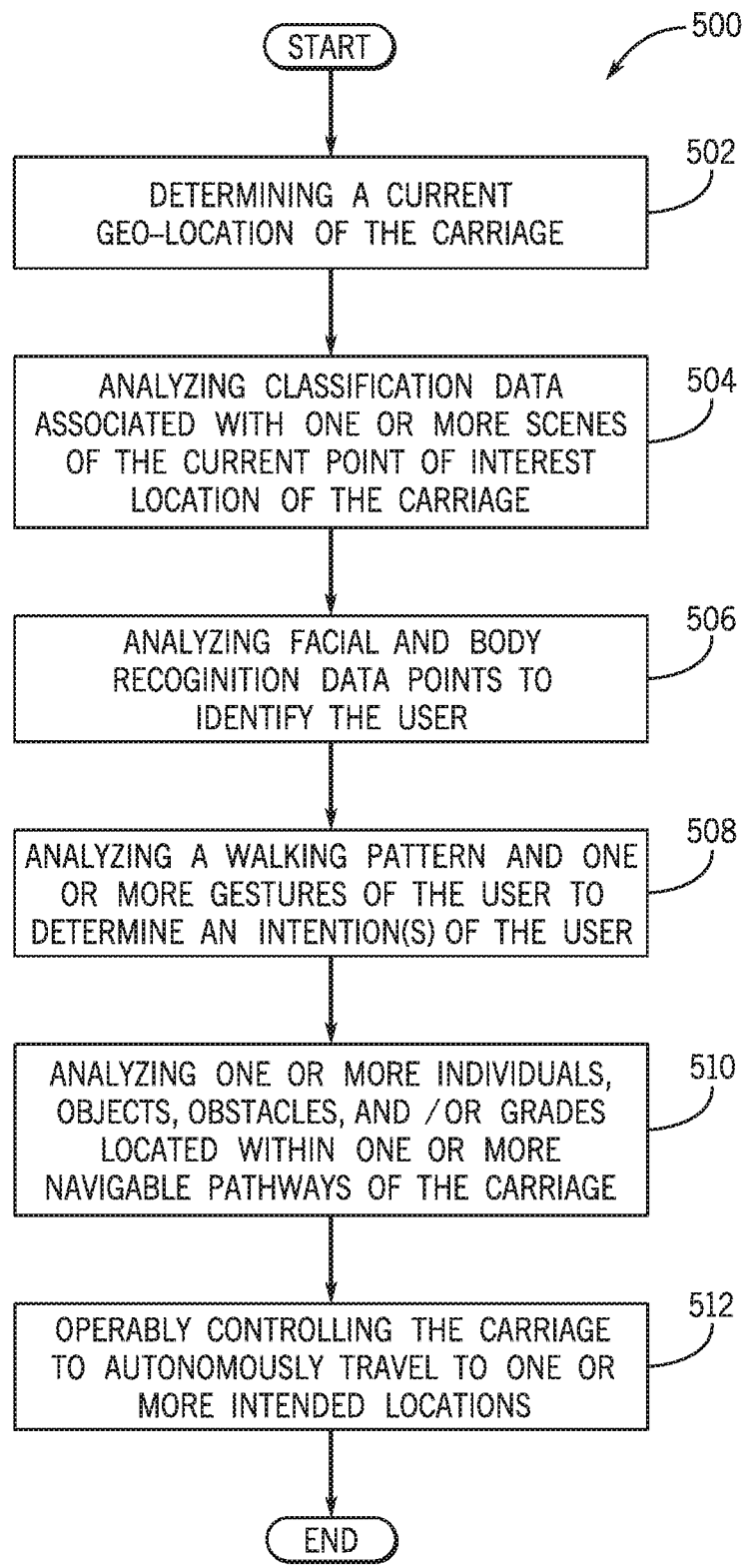
FIG. 5 is a process flow diagram of a method for operably controlling the carriage to autonomously travel within the current point of interest location of the carriage during an autonomous mode of the carriage control application according to an exemplary embodiment of the present disclosure.

FIG. 5 is a process flow diagram of a method 500 for operably controlling the carriage 102 to autonomously travel within the current point of interest location of the carriage 102 during the autonomous mode of the carriage control application 108 according to an exemplary embodiment of the present disclosure. FIG. 5 will be described with reference to the components of FIG. 1, through it is to be appreciated that the method 500 of FIG. 5 may be used with additional and/or alternative system components. The method 500 of FIG. 5 may be executed during the autonomous mode of the carriage control application 108. As discussed above, the autonomous mode of the application 108 may be implemented each time the user 104 utilizes one or more user interfaces or a physical input disposed upon the carriage 102 to initiate autonomous operation of the carriage 102 to enable the carriage 102 to be fully-autonomously operated or semi-autonomously operated to navigate within the current point of interest location of the carriage 102.

The method 500 may begin at block 502, wherein the method 500 may include determining a current geo-location of the carriage 102. In an exemplary embodiment, the autonomous control module 206 of the application 108 may be configured to communicate with the GPS sensors 118 of the carriage 102 during the autonomous mode of the application 108 to determine the current geo-location of the carriage 102 in the form of current geo-locational coordinates. In an additional embodiment, the autonomous control module 206 may additionally or alternatively be configured to communicate with the location sensors 152 of the portable device 128 to determine the current geo-location of the carriage 102 in the form of the current geo-locational coordinates.

In one embodiment, upon determining the current geo-location of the carriage 102, the autonomous control module 206 may be configured to communicate with the processor 132 of the external server 126 to access the location data repository 142 stored on the memory 140 of the external server 126. Upon accessing the location data repository 142, the autonomous control module 206 may be configured to query the location data repository 142 with the current geo-locational coordinates associated with the current geo-location of the carriage 102. Upon querying the location data repository 142, the autonomous control module 206 may determine the location description associated with the current point of interest location of the carriage 102.

In one embodiment, upon determining the location description associated with the current point of interest location of the carriage 102, the autonomous control module 206 may additionally retrieve data associated with one or more sub-points of interests (e.g., stores, restaurants) that may be located within the current point of interest of the carriage 102. The scene learning module 204 may additionally retrieve data associated with one or more sub-locations (e.g., restrooms, elevators, ramps) that may be located within the current point of interest of the carriage 102. In some embodiments, the scene learning module 204 may be configured to retrieve data that pertains to navigational travel paths associated with travel pathways located at the current point of interest location of the carriage 102, maps of one or more areas of the current point of interest location of the carriage 102, floorplans of one or more areas of the current point of interest location of the carriage 102, and associated data that may pertain to one or more particular areas of the current point of interest location of the carriage 102.

The method 500 may proceed to block 504, wherein the method 500 may include analyzing classification data associated with one or more scenes of the current point of interest location. In an exemplary embodiment, the autonomous control module 206 may communicate with the image sensors 120 of the carriage 102 to receive image data based on one or more captured images of one or more scenes of the current point of interest location of the carriage 102. Upon receiving the image data, the autonomous control module 206 may communicate with the neural network 110 to analyze the image data to determine scene data associated with a geography of the scene(s) of the surrounding environment within the current point of interest location of the carriage 102 (e.g., current location in which the carriage 102 is being operated).

In an exemplary embodiment, upon determining the scene data, the neural network 110 may be configured to access the neural network pretrained dataset 144 and query the dataset 144 with one or more data points of the scene data to determine one or more classifications of the one or more scenes of the current point of interest location based on the one or more images captured by the image sensors 120 of the carriage 102. In other words, the neural network 110 may be configured to access the neural network pretrained dataset 144 and query the dataset 144 with one or more data points of the scene data to determine one or more classifications that may be have been previously trained based on the communication of the location description associated with the current point of interest location and one or more point of interest location data points that are based on image data and/or LiDAR data (at block 410 of the method 400).

In one embodiment, the neural network 110 may thereby communicate one or more classifications of the one or more scenes to the autonomous control module 206. Additionally, the neural network 110 may communicate one or more user preferences with respect to the particular point of interest location of the carriage 102. As discussed, the one or more user preferences may include, but may not be limited to, one or more routines, one or more habits, one or more preferred navigable pathways, one or more preferred sub-points of interest, and/or one or more preferred sub-locations that may be routinely used by the user 104 at one or more particular point of interest locations of the carriage 102.

For example, one or more user preferences may pertain to one or more sub-points of interests that may be located at the current point of interest location and that may be preferred by the user 104 and/or one or more sub-locations that may be located at the current point of interest location and that may be preferred by the user 104. In an additional embodiment, the autonomous control module 206 may be configured to access the user dataset 130 stored on the storage unit 116 of the carriage 102 to determine one or more user preferences stored within the user profile. As discussed above, the user dataset 130 may be configured to store the user profile associated with the user 104 and one or more data points that may include one or more user preferences that may be associated with the user 104 that may be determined during the learning mode of the application 108.

The method 500 may proceed to block 506, wherein the method 500 may include analyzing facial and body recognition data points to identify the user 104. In an exemplary embodiment, the autonomous control module 206 may be configured to communicate with the image sensors 120 to receive image data associated with one or more images of the user 104. The one or more images of the user 104 may be captured as the user 104 is walking within a proximity of the carriage 102 during the autonomous mode of the application 108. Upon receiving the image data, the autonomous control module 206 may be configured to communicate with the neural network 110 to utilize the image logic stored within the neural network pretrained dataset 144 to determine one or more facial recognition data points and body recognition data points based on the image data associated with the one or more images of the user 104 captured during the autonomous mode.

In one embodiment, upon determining one or more facial recognition data points, the autonomous control module 206 may access the user dataset 130 to analyze the one or more facial recognition data points against one or more stored one or more facial recognition data points to thereby identify the user 104. Additionally, upon determining one or more body recognition data points, the autonomous control module 206 may access the user dataset 130 to analyze the one or more body recognition data points against one or more stored one or more body recognition data points to thereby identify the user 104. Accordingly, the autonomous control module 206 may continuously analyze one or more facial recognition data points and/or one or more body recognition data points that are determined based on images that are continuously captured by the image sensors 120 of the user 104 during the duration of the autonomous mode to continually identify and track the user 104 in a crowded environment to ensure that the carriage 102 is traveling within a particular (user preferred) proximity of the user 104.

In an additional embodiment, the autonomous control module 206 may be additionally or alternatively configured to communicate with the communication unit 114 to track the location of the user 104 based on one or more NFC signals that may be transmitted by the communication device 154 of the portable device 128 and received by the communication unit 114 of the carriage 102. The one or more NFC signals may be analyzed by the autonomous control module 206 to enable the carriage 102 to be located within a proximity (e.g., based on a user preference) of the user 104 (e.g., as the user 104 is walking within the current point of interest location of the carriage 102).

The method 500 may proceed to block 508, wherein the method 500 may include analyzing a walking pattern and one or more gestures of the user 104 to determine an intention(s) of the user 104. In an exemplary embodiment, the autonomous control module 206 may be configured to communicate with the image sensors 120 to continually receive image data associated with one or more images of the user 104. The one or more images of the user 104 may be captured as the user 104 is walking within a proximity of the carriage 102 during the autonomous mode of the application 108.

In one or more embodiments, the autonomous control module 206 may be configured to communicate with the neural network 110 stored on the external server 126 to utilize the image logic stored within the neural network pretrained dataset 144 to determine one or more gait recognition data points associated with the walking pattern of the user 104 and/or one or more gesture recognition data points of the user 104 associated with one or more directive gestures that may be provided by the user 104. Such data points may include specific measurements that may account for nodal points associated with various patterns of movements of the user's head, torso, arm, hands, legs, and/or feet. For example, such measurements may pertain to a walking movements and directions of travel of the user 104 and/or one or more directional gestures that may be provided by the user 104 as the user 104 is walking behind the carriage 102 as its being autonomously controlled to travel in front of the user 104.

Upon determining one or more gait recognition data points and/or one or more gesture recognition data points, the autonomous control module 206 may access the user dataset 130 to analyze the one or more gait recognition data points against stored gait recognition data and/or one or more gesture recognition data points against stored gait recognition data (stored at block 306 of the method 300) to thereby determine a walking pattern of the user 104 and/or one or more directional gestures that are provided by the user 104. The autonomous control module 206 may continuously analyze one or more one or more gait recognition data points that are determined based on images that are continuously captured by the image sensors 120 of the user 104 during the duration of the autonomous mode to continually determine the walking pattern of the user 104. Additionally or alternatively, the autonomous control module 206 may continuously analyze one or more one or more gesture recognition data points during the duration of the autonomous mode to continually determine one or more directional gestures that may be provided by the user 104 to indicate to the carriage 102 one or more directions that the user 104 may intend to travel and may prefer the carriage 102 to travel.

In one embodiment, upon determining the walking pattern of the user 104 and/or one or more directional gestures that are provided by the user 104, the autonomous control module 206 may be configured to analyze the walking pattern of the user 104 and/or one or more directional gestures to determine one or more intended directions that the user 104 may intended to travel within the current point of interest location of the carriage 102. In one configuration, the one or more intended directions that the user 104 may be intending to travel to may be based on the walking pattern of the user 104 that indicates a direction of travel of the user 104. For example, the gait of the user 104 that may include the position of the user's shoulders and feet may indicate that the user 104 is turning toward a particular direction. The one or more directions that the user 104 may be intending to travel to may also be based on directive gestures may be provided by the user 104 (e.g., the user 104 pointing towards a travel path located in a leftward direction).

In some embodiments, the autonomous control module 206 may additionally analyze classifications of the scene(s) and one or more preferences of the user 104 to predict one or more intended directions that the user 104 may engage in at one or more future points in time (e.g., 5 seconds in the future). As discussed above, the neural network 110 may determine one or more classifications of the one or more scenes of the current point of interest location based on the one or more images captured by the image sensors 120 of the carriage 102 and one or more user preferences that may be based on trained point of interest data. In an additional embodiment, the autonomous control module 206 may be configured to access the user dataset 130 stored on the storage unit 116 of the carriage 102 to determine one or more user preferences stored within the user profile. Accordingly, the autonomous control module 206 may be configured to determine one or more intentions of the user 104 at one or more future points in time with respect to traveling within the current point of interest location of the carriage 102 based on the walking pattern, one or more directional gestures that may be provided by the user 104, one or more classifications of the scene(s) of the current point of interest location of the carriage 102, and one or more user preferences.

As an illustrative example, if the user 104 provides a gesture of pointing in a right hand direction towards a travel pathway that includes five stores within a shopping mall in which the carriage 102 is traveling, the autonomous control module 206 may analyze the classification data associated with the one or more scenes of the current point of interest location to determine the particular stores that may be located towards the right hand side of the user 104 on the pathway, the gestures provided by the user 104, and the one or more user preferences that may include one or more preferred stores that may be routinely used by the user 104 within the shopping mall to determine an intention(s) of the user 104 with respect to the traveling to a particular store(s) within the shopping mall.

The method 500 may proceed to block 510, wherein the method 500 may include analyzing one or more individuals, objects, obstacles, and/or grades located within a travel path of the carriage 102. In an exemplary embodiment, upon determining one or more intentions of the user 104, the autonomous control module 206 may be configured to communicate with the image sensors 120 to continually receive image data associated with one or more images of one or more scenes of the surrounding environment of the carriage 102 within the current point of interest location of the carriage 102. Additionally or alternatively, the autonomous control module 206 may be configured to communicate with the LiDAR sensors 122 of the carriage 102 to continually receive LiDAR data associated with the locations of the user 104 and/or one or more obstacles, objects, and/or individuals that may be located within the scene of the surrounding environment of the carriage 102 within the current point of interest location of the carriage 102.

In one or more embodiments, the autonomous control module 206 may additionally be configured to analyze one or more classifications of the one or more scenes of the surrounding environment to determine one or more navigable pathways may include, but may not be limited to, roads, paths, trails, hallways, lanes, ramps, and/or spaces that may possibly be utilized by the carriage 102 to be traveled upon to reach an intended location of the user 104. The image data, LiDAR data and/or the classifications of the scene(s) may enable the autonomous control module 206 to determine one or more individuals, objects, obstacles that are located on or near one or more navigable pathways and/or grades (e.g., inclines) that are associated with one or more navigable pathways that may be utilized by the carriage 102 to reach one or more intended locations of the user 104.

The method 500 may proceed to block 512, wherein the method 500 may include operably controlling the carriage 102 to autonomously travel to one or more intended locations. In an exemplary embodiment, the autonomous control module 206 may be configured to communicate with the ECU 106 of the carriage 102 to operably control the motor 112, steering system, braking system, and additional components of the carriage 102 to autonomously control the carriage 102 to autonomously travel to one or more intended locations of the user 104. The carriage 102 may be controlled to travel to the one or more intended locations of the user 104 using one or more navigable pathways based on the user's intentions and/or areas that may be accessed and utilized (e.g., areas that are not blocked) by the carriage 102 based on one or more individuals, objects, obstacles, that are located on or near one or more navigable pathways and/or grades (e.g., inclines) that are associated with one or more navigable pathways.

In particular, the autonomous control module 206 may continually analyze classification data associated with one or more scenes of the current point of interest location of the carriage 102, facial and body recognition data points, one or more NFC signals received from the portable device 128, the walking pattern, directive gestures provided by the user 104, one or more preferences of the user 104, and/or one or more individuals, objects, obstacles, and/or grades to control the carriage 102 to autonomously travel to one or more sub-points of interest, one or more sub-locations, and/or one or more additional areas within or near the current point of interest location of the carriage 102.

Accordingly, the carriage 102 may be controlled to be autonomously operated based on user intentions with respect to traveling using one or more travel pathways to one or more sub-points of interest and/or one or more sub-locations that are located at or near the current point of interest location of the carriage 102. Stated differently, the carriage control application 108 may operably control the carriage 102 to be autonomously operated to follow one or more travel paths while being in a particular proximity to the user 104 and/or to reach an intended location of the user 104 as the user 104 arrives at the intended location or is located at the intended location.

In some embodiments, the autonomous control module 206 may communicate with the weight balancing system to provide one or more levels of weight based on one or more occupants that are occupying the carriage 102 as determined based on data provided by the occupancy sensors 124, one or more turning angles that may be utilized by the steering system of the carriage 102, one or more grades of one or more pathways that may be encountered by the carriage 102, and/or one or more objects (e.g., bags) that may be attached to and/or held in one or more portions of the carriage 102 (e.g., an underneath storage compartment). Additionally or alternatively, the autonomous control module 206 may communicate with the shock absorption system to provide one or more levels of shock absorption based on one or more occupants that are occupying the carriage 102 based on data provided by the occupancy sensors 124, one or more turning angles that may be utilized by the steering system of the carriage 102, one or more terrains that may be encountered by the carriage 102, one or more bumps that may be encountered by the carriage 102 and/or one or more objects that may be attached to and/or held in one or more portions of the carriage 102.

Figure 6:
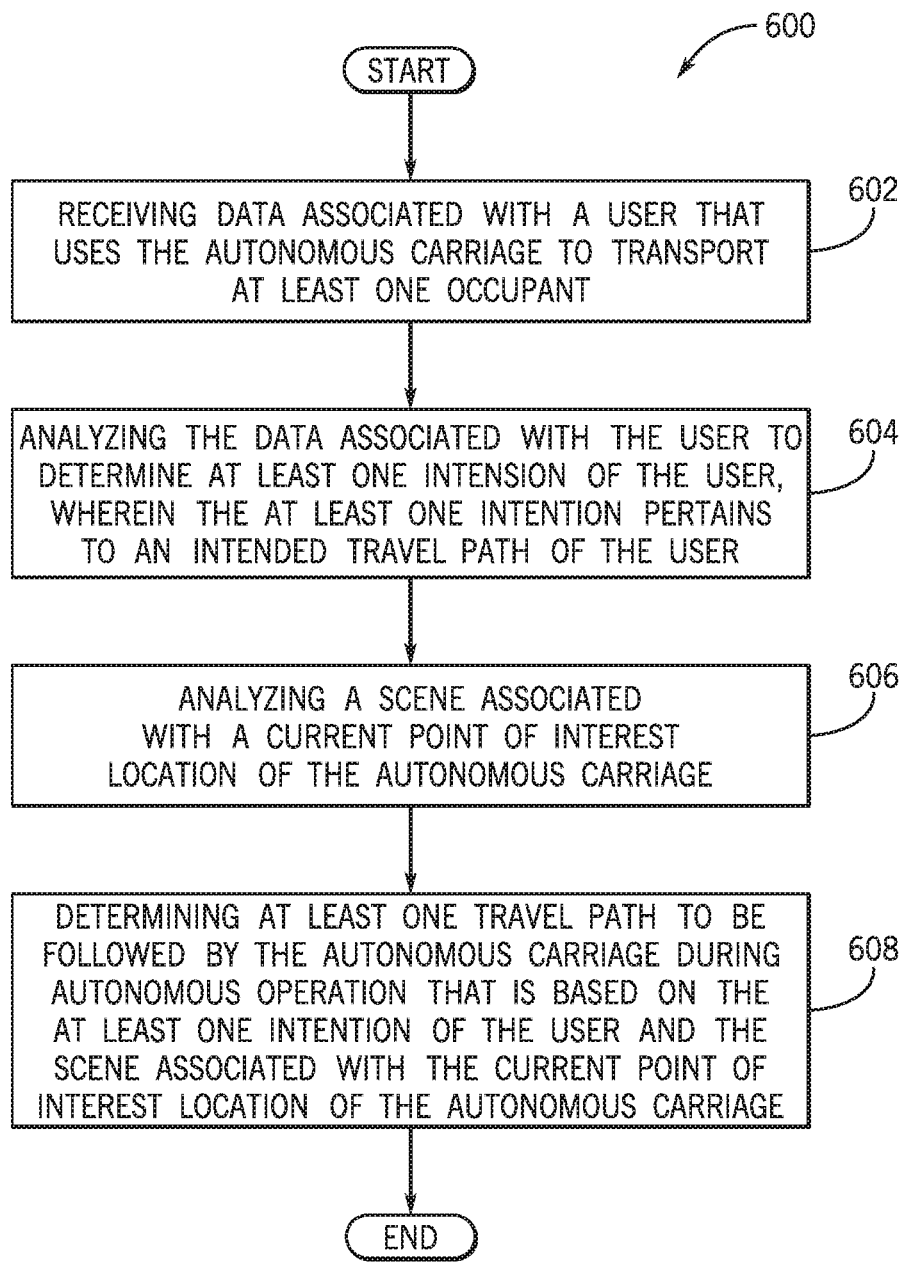
FIG. 6 is a process flow diagram of a method for operably controlling an autonomous carriage based on user intentions according to an exemplary embodiment of the present disclosure.

FIG. 6 is a process flow diagram of a method 600 for operably controlling an autonomous carriage based on user intentions according to an exemplary embodiment of the present disclosure. FIG. 6 will be described with reference to the components of FIG. 1, through it is to be appreciated that the method 600 of FIG. 6 may be used with additional and/or alternative system components. The method 600 may begin at block 602, wherein the method 600 may include receiving data associated with a user 104 that uses the autonomous carriage 102 to transport at least one occupant.

The method 600 may proceed to block 604, wherein the method 600 may include analyzing the data associated with the user to determine at least one intention of the user 104. The method 600 may proceed to block 606, wherein the method 600 may include analyzing a scene associated with a current point of interest location of the autonomous carriage 102. The method 600 may proceed to block 608, wherein the method 600 may include determining at least one travel path to be followed by the autonomous carriage 102 during autonomous operation that is based on the at least one intention of the user 104 and the scene associated with the current point of interest of the autonomous carriage.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling an autonomous carriage based on user intentions, comprising:
   receiving data associated with a user that uses the autonomous carriage to transport at least one occupant;
   analyzing the data associated with the user to determine at least one intention of the user, wherein the at least one intention pertains to an intended travel path of the user;
   analyzing a scene associated with a current point of interest location of the autonomous carriage; and
   determining at least one travel path to be followed by the autonomous carriage during autonomous operation that is based on the at least one intention of the user and the scene associated with the current point of interest of the autonomous carriage.

2. The computer-implemented method of claim 1, wherein receiving data associated with the user that uses the autonomous carriage includes determining gait recognition data and gesture recognition data associated with the user, wherein the gait recognition data and gesture recognition data are stored within a user profile associated with the user.

3. The computer-implemented method of claim 2, further including determining a location description associated with the current point of interest location of the autonomous carriage, wherein the location description includes data associated with a sub-point of interest, a sub-location, and at least one travel path that is included within the current point of interest location of the autonomous carriage.

4. The computer-implemented method of claim 3, further including determining at least one user preference associated with the current point of interest location of the autonomous carriage, wherein the at least one user preference includes at least one of: a routine, a habit, a preferred navigable pathway, a preferred sub-point of interest, and a preferred sub-location of the user when the user is located at the current point of interest location of the autonomous carriage.

5. The computer-implemented method of claim 4, further including training a neural network with the location description and the at least one user preference associated with the current point of interest location of the autonomous carriage during a learning mode.

6. The computer-implemented method of claim 5, wherein analyzing the data associated with the user to determine the at least one intention of the user includes communicating with the neural network to analyze the at least one user preference associated with the current point of interest to predict at least one of: an intended sub-point of interest, an intended sub-location, and the intended travel path of the user.

7. The computer-implemented method of claim 5, wherein analyzing the data associated with the user to determine the at least one intention of the user includes analyzing at least one gait recognition data point and at least one gesture recognition data point of the user sensed during an autonomous mode in which the autonomous carriage is configured to be autonomously operated.

8. The computer-implemented method of claim 7, wherein the at least one gait recognition data point and the at least one gesture recognition data point that are sensed during the autonomous mode are compared against the gait recognition data and the gesture recognition data stored within the user profile associated with the user during the learning mode to predict at least one of: an intended sub-point of interest, an intended sub-location, and the intended travel path of the user.

9. The computer-implemented method of claim 8, wherein analyzing the scene associated with the current point of interest location of the autonomous carriage includes communicating with the neural network to classify the scene based on image data of the scene captured during the autonomous mode, wherein the scene is classified by the neural network based on the location description and the at least one user preference associated with the current point of interest location of the autonomous carriage trained during the learning mode.

10. A system for controlling an autonomous carriage based on user intentions, comprising:
   a memory storing instructions when executed by a processor cause the processor to:
   receive data associated with a user that uses the autonomous carriage to transport at least one occupant;
   analyze the data associated with the user to determine at least one intention of the user, wherein the at least one intention pertains to an intended travel path of the user;
   analyze a scene associated with a current point of interest location of the autonomous carriage; and
   determine at least one travel path to be followed by the autonomous carriage during autonomous operation that is based on the at least one intention of the user and the scene associated with the current point of interest of the autonomous carriage.

11. The system of claim 10, wherein receiving data associated with the user that uses the autonomous carriage includes determining gait recognition data and gesture recognition data associated with the user, wherein the gait recognition data and gesture recognition data are stored within a user profile associated with the user.

12. The system of claim 11, further including determining a location description associated with the current point of interest location of the autonomous carriage, wherein the location description includes data associated with a sub-point of interest, a sub-location, and at least one travel path that is included within the current point of interest location of the autonomous carriage.

13. The system of claim 12, further including determining at least one user preference associated with the current point of interest location of the autonomous carriage, wherein the at least one user preference includes at least one of: a routine, a habit, a preferred navigable pathway, a preferred sub-point of interest, and a preferred sub-location of the user when the user is located at the current point of interest location of the autonomous carriage.

14. The system of claim 13, further including training a neural network with the location description and the at least one user preference associated with the current point of interest location of the autonomous carriage during a learning mode.

15. The system of claim 14, wherein analyzing the data associated with the user to determine the at least one intention of the user includes communicating with the neural network to analyze the at least one user preference associated with the current point of interest to predict at least one of: an intended sub-point of interest, an intended sub-location, and the intended travel path of the user.

16. The system of claim 14, wherein analyzing the data associated with the user to determine the at least one intention of the user includes analyzing at least one gait recognition data point and at least one gesture recognition data point of the user sensed during an autonomous mode in which the autonomous carriage is configured to be autonomously operated.

17. The system of claim 16, wherein the at least one gait recognition data point and the at least one gesture recognition data point that are sensed during the autonomous mode are compared against the gait recognition data and the gesture recognition data stored within the user profile associated with the user during the learning mode to predict at least one of: an intended sub-point of interest, an intended sub-location, and the intended travel path of the user.

18. The system of claim 17, wherein analyzing the scene associated with the current point of interest location of the autonomous carriage includes communicating with the neural network to classify the scene based on image data of the scene captured during the autonomous mode, wherein the scene is classified by the neural network based on the location description and the at least one user preference associated with the current point of interest location of the autonomous carriage trained during the learning mode.

19. A non-transitory computer readable storage medium storing instructions that when executed by a computer, which includes a processor perform a method, the method comprising:
  receiving data associated with a user that uses an autonomous carriage to transport at least one occupant;
  analyzing the data associated with the user to determine at least one intention of the user, wherein the at least one intention pertains to an intended travel path of the user;
  analyzing a scene associated with a current point of interest location of the autonomous carriage; and
  determining at least one travel path to be followed by the autonomous carriage during autonomous operation that is based on the at least one intention of the user and the scene associated with the current point of interest of the autonomous carriage.

20. The non-transitory computer readable storage medium of claim 19, wherein analyzing the scene associated with the current point of interest location of the autonomous carriage includes communicating with a neural network to classify the scene based on image data of the scene captured during an autonomous mode, wherein the scene is classified by the neural network based on a location description and at least one user preference associated with the current point of interest location of the autonomous carriage trained during a learning mode.

* * * * *